(12) United States Patent
Xing

(10) Patent No.: US 11,070,271 B2
(45) Date of Patent: Jul. 20, 2021

(54) 802.11 NETWORK-BASED CSI OBTAINING METHOD AND APPARATUS

(71) Applicant: HUAWEI TECHNOLOGIES CO., LTD., Guangdong (CN)

(72) Inventor: Zhihao Xing, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/415,409

(22) Filed: May 17, 2019

(65) Prior Publication Data

US 2019/0273545 A1 Sep. 5, 2019

Related U.S. Application Data

(63) Continuation of application No. PCT/CN2017/111309, filed on Nov. 16, 2017.

(30) Foreign Application Priority Data

Nov. 18, 2016 (CN) .......................... 201611031771.2

(51) Int. Cl.
*H04B 7/06* (2006.01)
*H04B 17/309* (2015.01)
(Continued)

(52) U.S. Cl.
CPC ......... *H04B 7/0626* (2013.01); *H04B 17/309* (2015.01); *H04L 1/0026* (2013.01);
(Continued)

(58) Field of Classification Search
CPC ... H04B 7/0626; H04B 17/309; H04L 5/0005; H04L 5/0091; H04L 1/0027;
(Continued)

(56) References Cited

U.S. PATENT DOCUMENTS

| 2007/0201566 A1* | 8/2007 | Solomon | .............. H04B 7/0626 |
| | | | 375/260 |
| 2014/0112184 A1* | 4/2014 | Chai | ..................... H04L 1/0026 |
| | | | 370/252 |

(Continued)

FOREIGN PATENT DOCUMENTS

| CN | 102340868 A | 2/2012 |
| CN | 103023589 A | 4/2013 |

(Continued)

OTHER PUBLICATIONS

Kaishun Wu et al. CSI-Based Indoor Localizalion, IEEE Transactions on Parallel and Distributed Systems, vol. 24, No. 7, Jul. 2013, pp. 1300-1309.

(Continued)

*Primary Examiner* — Thinh D Tran
(74) *Attorney, Agent, or Firm* — Womble Bond Dickinson (US) LLP

(57) ABSTRACT

Relating to the field of communications technologies, an embodiment of the present invention discloses an 802.11 network-based CSI obtaining method and apparatus, so as to provide a CSI obtaining mechanism that addresses a positioning requirement, to improve accuracy of a terminal positioning process by providing more comprehensive CSI for a terminal. An embodiment of the present invention is applicable to a CSI collecting process.

17 Claims, 7 Drawing Sheets

(51) Int. Cl.

| | | |
|---|---|---|
| *H04L 1/00* | (2006.01) | |
| *H04W 24/10* | (2009.01) | |
| *H04W 48/16* | (2009.01) | |
| *H04L 5/00* | (2006.01) | |
| *H04W 64/00* | (2009.01) | |
| *H04W 80/02* | (2009.01) | |

(52) U.S. Cl.
CPC .......... *H04L 1/0027* (2013.01); *H04L 5/0005* (2013.01); *H04L 5/0091* (2013.01); *H04W 24/10* (2013.01); *H04W 48/16* (2013.01); *H04W 64/00* (2013.01); *H04W 80/02* (2013.01)

(58) Field of Classification Search
CPC .... H04L 1/0026; H04L 1/0023; H04W 64/00; H04W 24/10; H04W 48/16; H04W 80/02; H04W 4/02; H04W 4/029
See application file for complete search history.

(56) References Cited

U.S. PATENT DOCUMENTS

| | | | | |
|---|---|---|---|---|
| 2014/0169322 | A1* | 6/2014 | Ouchi | ................. H04W 72/042 370/329 |
| 2014/0286326 | A1* | 9/2014 | Jang | ................... H04W 64/003 370/338 |
| 2015/0133154 | A1* | 5/2015 | Do | ........................ G01S 5/0236 455/456.1 |
| 2015/0311964 | A1 | 10/2015 | Sohn et al. | |
| 2015/0326339 | A1 | 11/2015 | Huang | |
| 2016/0043783 | A1* | 2/2016 | Xia | ....................... H04B 7/0456 370/329 |
| 2016/0066158 | A1 | 3/2016 | Xiao et al. | |
| 2016/0262050 | A1 | 9/2016 | Merlin et al. | |

FOREIGN PATENT DOCUMENTS

| | | |
|---|---|---|
| CN | 103202085 A | 7/2013 |
| CN | 104168650 A | 11/2014 |
| CN | 104812061 A | 7/2015 |
| CN | 105828289 A | 8/2016 |
| EP | 2860883 A1 | 4/2015 |
| WO | 2014/109561 A1 | 7/2014 |
| WO | 2016/122852 A1 | 8/2016 |

OTHER PUBLICATIONS

Kaishun Wu et al. FILA: Fine-grained Indoor Localization, 2012 proceedings IEEE INFOCOM, total 9 pages.
Manikanta Kotaru et al. SpotFi: Decimeter Level Localization Using WiFi, SIGCOMM '15, Aug. 17-21, 2015, total 14 pages.
Souvik Sen et al. Spot Localization using PHY Layer Information, MobiSys'12, Jun. 25-29, 2012, total 14 pages.
Xuyu Wang et al. DeepFi: Deep Learning for Indoor Fingerprinting Using Channel State Information, IEEE 2015. pp. 1666-1671.

* cited by examiner

802.11 NETWORK-BASED CSI OBTAINING METHOD AND APPARATUS

CROSS-REFERENCE TO RELATED APPLICATIONS

This application is a continuation of International Application No. PCT/CN2017/111309, filed on Nov. 16, 2017, which claims priority to Chinese Patent Application No. 201611031771.2, filed on Nov. 18, 2016. The disclosures of the aforementioned applications are hereby incorporated by reference in their entireties.

TECHNICAL FIELD

The present invention relates to the field of communications technologies, and in particular, to an 802.11 network-based CSI (Channel State Information) obtaining method and apparatus.

BACKGROUND

Theoretically, when locations of transmitters are fixed, a one-to-one mapping relationship exists between CSI between a receiver and a plurality of transmitters in vicinity of the receiver, and a location of the receiver. In view of this, with the development of communications technologies, and in particular, the popularity of positioning technologies, in a process of positioning a to-be-positioned terminal, a location of the terminal may be determined by collecting CSI corresponding to the location of the terminal, so that an effect of positioning the terminal is achieved.

In 802.11, whenever an STA (Station) device receives a PPDU (Physical-layer Protocol Data Unit) from an air interface, a physical layer obtains CSI between a transmitter and the physical layer by processing a preamble sequence of the PPDU. The CSI includes information about impact of a channel between the transmitter and a terminal acting as a receiver on an amplitude and a phase of a wireless data signal. According to this information, the receiver may correspondingly compensate or correct a received data signal, so as to improve a signal-to-noise ratio and demodulation quality of the data signal. However, in 802.11, CSI is tightly coupled with a data receiving process and is used only within a PPDU demodulation process, but cannot be used in a terminal positioning process by a service request program of, for example, an upper-layer application.

In addition, a relatively large difference exists between CSI obtaining requirements of a data transmission application and a positioning application. In a data transmission application, a typical operation manner of an STA device is first joining a network created by an 802.11 AP (Access Point) device and then staying on an operating channel of the AP device to receive and send data. In this process, the STA device can only detect and receive a PPDU appearing on a current operating channel of the STA device.

It can be learned that, when the prior-art technical solution is used, although CSI collection can be implemented, collected CSI cannot be applied to a positioning application. Therefore, a terminal positioning process cannot be implemented based on the collected CSI. In addition, the collected CSI is subject to a great limitation: The collected CSI includes only CSI between a terminal and an AP device on a channel on which the terminal currently resides. Therefore, the foregoing CSI obtaining solution cannot provide comprehensive CSI for terminal positioning, and reduces accuracy of the terminal positioning process.

SUMMARY

An embodiment of the present invention provides an 802.11 network-based CSI obtaining method and apparatus, so as to provide a CSI obtaining mechanism that addresses a positioning requirement, to improve accuracy of a terminal positioning process by providing more comprehensive CSI for a terminal.

To achieve the foregoing objective, the following technical solutions are used in embodiments of the present invention.

According to one aspect, an embodiment of the present invention provides an 802.11 network based CSI obtaining method, where the method is applied to a station STA device on an 802.11 network. The STA device is provided with a CSI obtaining module and a service request program that runs on the STA device, the service request program and the CSI obtaining module are capable of transmitting data to each other through a service request interface and an asynchronous notification interface. The method includes: receiving, by the CSI obtaining module through the service request interface, a request message sent by the service request program, where the request message includes at least a channel listening list, a channel listening linger time, and a target AP device list, the channel listening list records a to-be-listened-on frequency band and a to-be-listened-on channel corresponding to each to-be-listened-on frequency band, and the channel listening linger time is a time for which the CSI obtaining module listens to a PPDU sent by a target AP device and extracts CSI from the PPDU, on a single channel; extracting, by the CSI obtaining module according to the channel listening linger time, on all to-be-listened-on channels recorded in the channel listening list, CSI from PPDUs sent by all target AP devices recorded in the target AP device list; and when a group of CSI is collected, sending, by the CSI obtaining module, the group of CSI to the service request program through the asynchronous notification interface, where the group of CSI is used to represent collected CSI that is carried by one PPDU. It can be learned that the service request interface and the asynchronous notification interface that are provided in embodiments of the present invention can collect CSI between the STA device and an AP device meeting a requirement in vicinity of the STA device, in response to a CSI collection request put forward by a service request program of, for example, an upper-layer application. In this way, more comprehensive CSI can be provided for the STA device in time to address a positioning requirement, improving accuracy of a terminal positioning process.

In one embodiment, the channel listening list may not record any content. Then, after the receiving, by the CSI obtaining module through the service request interface, a request message sent by the service request program, the CSI obtaining module may directly extract, on a channel on which the STA device currently resides, CSI from PPDUs sent by all target AP devices recorded in the target AP device list, so that efficiency and quality of CSI obtaining are improved.

In one embodiment, the extracting, by the CSI obtaining module, CSI from PPDUs sent by all target AP devices recorded in the target AP device list may be specifically implemented as follows: obtaining, by the CSI obtaining module, from a received PPDU, a MAC address of an AP device that sends the PPDU; and extracting, by the CSI obtaining module, CSI directly from the PPDU when the MAC address is a MAC address of a target AP device. In this way, it is ensured that the collected CSI is CSI required by the STA device, and efficiency and quality of CSI obtaining are improved.

In one embodiment, the target AP device list may not record any content, or there is at least one target AP device whose MAC address is a special preset value in the target AP device list, and the special preset value does not represent a MAC address of any target AP device. Then, after the receiving, by the CSI obtaining module through the service request interface, a request message sent by the service request program, the CSI obtaining module needs to extract, according to the channel listening linger time, on all to-be-listened-on channels recorded in the channel listening list, CSI from all received PPDUs. In this way, it is ensured that the CSI obtaining module can still successfully implement a CSI obtaining operation.

In one embodiment, the request message may further include a total listening time. Then, after the sending, by the CSI obtaining module, the group of CSI to the service request program through the asynchronous notification interface, when a sum of time of listening on all the to-be-listened-on channels is less than the total listening time, the CSI obtaining module may continue, according to the channel listening linger time, receiving the PPDUs sent by all the target AP devices and extracting the CSI, on the to-be-listened-on channels. This means that, if a linger time on a current channel does not exceed the channel listening linger time, the STA device continues listening and obtaining CSI on the current channel; otherwise, the STA device changes the channel listened on by the STA device to a channel next to the current channel in the channel listening list, to perform listening and implement a CSI obtaining process on the next channel. After a CSI obtaining process on the last to-be-listened-on channel in the channel listening list is implemented, the CSI obtaining module instructs the STA device to change the operating channel to the first to-be-listened-on channel in the channel listening list, to start a next round of CSI obtaining. The foregoing CSI obtaining process is repeated until the CSI obtaining module receives a CSI collection termination message "stop obtaining CSI" that is sent by the service request program or until a total time of listening exceeds the total listening time. Then, the CSI obtaining module stops the CSI obtaining process.

In one embodiment, the service request interface may specifically include a first service request interface and a second service request interface, the CSI obtaining module can receive, through the first service request interface, the request message sent by the service request program, and after sending the group of CSI to the service request program through the asynchronous notification interface, the CSI obtaining module receives, through the second service request interface, a CSI collection termination message sent by the service request program, and terminates the CSI collecting process.

In one embodiment, because different positioning solutions have different requirements on a time interval for obtaining CSI between a to-be-positioned STA and an AP device in vicinity of the to-be-positioned STA, to ensure that a collection interval meets a requirement of a CSI obtaining service request application in the CSI collecting process, the request message may further include a maximum CSI obtaining interval. Then, after the group of CSI is collected, when a next group of CSI that belongs to a same AP device as the group of CSI is not collected within the maximum CSI obtaining interval, the CSI obtaining module broadcasts a request packet to each AP device on a channel on which the same AP device resides, so that each AP device on the channel on which the same AP device resides sends a reply packet to the CSI obtaining module; and the CSI obtaining module extracts CSI from the reply packet.

In one embodiment, the sending, by the CSI obtaining module, the group of CSI to the service request program through the asynchronous notification interface may be specifically implemented as follows: generating, by the CSI obtaining module, a CSI notification message corresponding to the group of CSI, where the CSI notification message includes a MAC address and content of the group of CSI, and the MAC address is a MAC address of an AP device that sends the PPDU carrying the group of CSI; and sending, by the CSI obtaining module, the CSI notification message to the service request program, so that the service request program can schedule the group of CSI according to the CSI notification message.

According to another aspect, an embodiment of the present invention provides an 802.11 network-based CSI obtaining apparatus. The apparatus may implement functions performed by the CSI obtaining module in the foregoing method example, and the functions may be implemented by using hardware, or may be implemented by using hardware executing corresponding software. The hardware or software includes one or more modules that correspond to the foregoing functions.

In one embodiment, a structure of the apparatus includes a processor and a communications interface. The processor is configured to support the apparatus in implementing corresponding functions in the foregoing method. The communications interface is configured to support communication between the apparatus and another device. The apparatus may further include a memory, and the memory is configured to be coupled to the processor and store a program instruction and data that are necessary for the apparatus.

In an embodiment of the present invention, the service request interface and the asynchronous notification interface are provided on the STA device on the 802.11 network. The two interfaces can implement data transmission between the service request program and the CSI obtaining module. The CSI obtaining module can receive, through the service request interface, the request message sent by the service request program. The request message includes at least the channel listening list, the channel listening linger time, and the target AP device list. The CSI obtaining module can lock a to-be-listened-on channel according to the foregoing parameters, and according to a time specified by the channel listening linger time, listen to a PPDU sent by a target AP device and extract CSI from the PPDU, on the to-be-listened-on channel. In addition, when a group of CSI is collected, the CSI obtaining module may feed back the group of CSI to the service request program in time through the asynchronous notification interface. It can be learned that the service request interface and the asynchronous notification interface that are provided in embodiments of the present invention can collect CSI between the STA device and an AP device meeting a requirement in vicinity of the STA device, in response to a CSI collection request put forward by a service request program of, for example, an upper-layer application. In this way, more comprehensive CSI can be provided for the STA device in time to address a positioning requirement, improving accuracy of a terminal positioning process.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
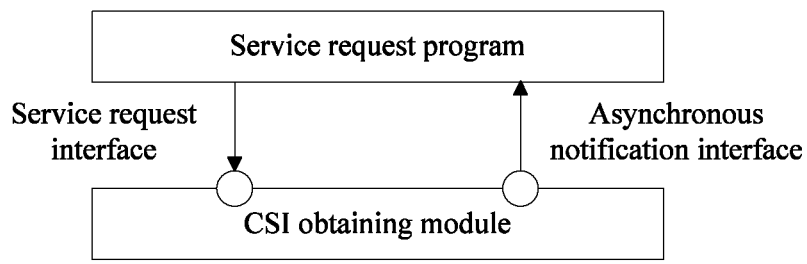
FIG. 1 is a structural diagram of data exchange between a CSI obtaining module and an upper-layer application according to an embodiment of the present invention.

The embodiments of the present invention may be applied to an 802.11 network communications system, and the system includes at least an STA device and an AP device. As shown in FIG. 1, the STA device is provided with a CSI obtaining module and a service request program that runs on the STA device. The service request program may send a request message, such as a request message "start obtaining CSI", to the CSI obtaining module through a CSI obtaining service request interface. The CSI obtaining module may send a group of CSI to the service request program through an asynchronous notification interface. It should be noted that, the service request interface may include a first service request interface and a second service request interface. Then, the service request program may send the request message to the CSI obtaining module through the first service request interface, and may further send a CSI collection termination message, such as "stop obtaining CSI", to the CSI obtaining module through the second service request interface.

Figure 2:
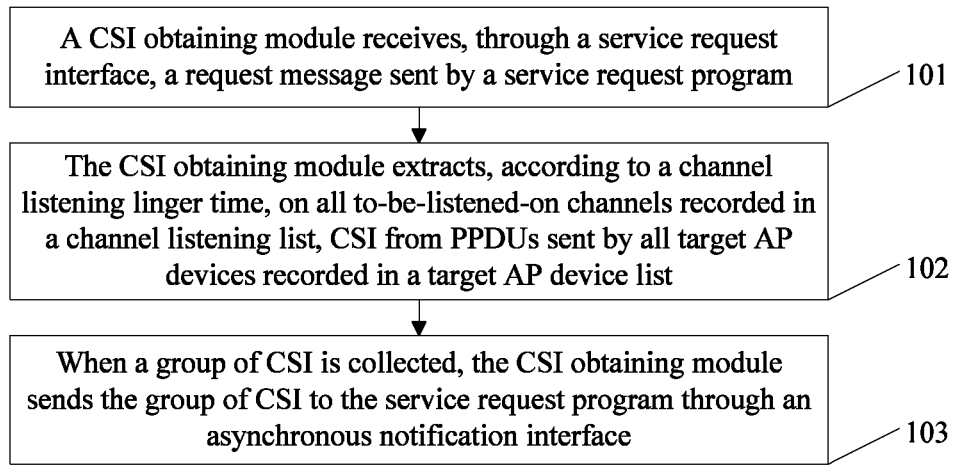
FIG. 2 is a flowchart of an 802.11 network-based CSI obtaining method according to an embodiment of the present invention.

An embodiment of the present invention provides an 802.11 network-based CSI obtaining method. As shown in FIG. 2, the method may be applied to an 802.11 STA device, that is, an STA device in an 802.11 network communications system. A process of the method includes the following operations.

Operation 101. A CSI obtaining module receives, through a service request interface, a request message sent by a service request program.

The request message includes at least a channel listening list, a channel listening linger time, and a target AP device list. The channel listening list records a to-be-listened-on frequency band and a to-be-listened-on channel corresponding to each to-be-listened-on frequency band, and the channel listening linger time is a time for which the CSI obtaining module listens to a PPDU sent by a target AP device and extracts CSI from the PPDU, on a single channel.

It should be noted that, in the 802.11 standard, a plurality of channels (English: channel) are defined on each of a plurality of frequency bands (English: band) including 2.4 GHz, 5 GHz, and 60 GHz. However, in different countries and regions, an actual available list of channels varies because of difference in radio regulations. In addition, in some positioning applications, a to-be-positioned STA device may learn of operating channels of AP devices in an environment in advance by some technical means (for example, by querying a dedicated server). Therefore, the foregoing channel listening list may indicate a channel that needs to be listened on in a CSI obtaining process. After receiving the request message, the CSI obtaining module may instruct, according to the channel listening list, the STA device to linger on and listen on channels given in the list one by one, to receive a PPDU that is sent by an AP device in vicinity of the STA device and that appears in an air interface, and to extract CSI from the PPDU. Providing the channel listening list in the request message can prevent the STA device from performing ineffective listening on some channels on which no AP device appears, so that CSI obtaining efficiency is improved.

In addition, the service request program that acts as a service caller may have different requirements for sources of CSI that needs to be collected. For example, in some positioning applications, the to-be-positioned STA device may learn of, in advance by some technical means (for example, by querying a server), information about operating parameters of AP devices in an environment, for example, MAC addresses, operating frequency bands, operating channels, and transmit frequencies of periodically-transmitted frames (such as beacon frames or other frames) of the AP devices. Therefore, when CSI between the STA device and AP devices in vicinity of the STA device is to be obtained, a desired target AP device may be designated, so as to improve efficiency or quality of CSI collection. Therefore, the request message may carry the target AP device list.

After receiving the request message, the CSI obtaining module immediately starts a CSI obtaining process. It should be noted that the STA device does not need to join any network created by any AP device to perform a CSI obtaining task, but starts channel listening immediately to receive and process a PPDU that appears in the air interface, and extract, from the PPDU, CSI between the STA device on which the CSI obtaining module is located and an AP device that sends the PPDU.

It should be noted that the channel listening linger time may be regarded as being used to indicate a time for which the CSI obtaining module listens to a PPDU sent by an AP device and extracts CSI from the PPDU, on a single channel. The channel listening linger time is a listening time specific to each listened-on channel. In this embodiment of the present invention, to ensure that a uniform listening mechanism is used on all to-be-listened-on channels in a listening process, a same channel listening linger time may be applied for all to-be-listened-on channels.

Operation 102. The CSI obtaining module extracts, according to a channel listening linger time, on all to-be-listened-on channels recorded in a channel listening list, CSI from PPDUs sent by all target AP devices recorded in a target AP device list.

In a PPDU, both a short training field (STF) and a long training field (LTF) in a preamble sequence are pre-defined fixed symbol sequences. In this embodiment of the present invention, CSI may be obtained by processing an LTF in a preamble sequence of a PPDU.

It should be noted in particular that 802.11 includes a plurality of different systems, such as 802.11b/g/a/n/ac, and formats, quantities, and bandwidth occupied by transmission, of LTFs in their preamble sequences are different. Therefore, in a CSI extracting process, different processing is required for different PPDUs. Details are not described herein. It should be noted that wider LTF transmission bandwidth means a higher temporal resolution of correspondingly obtained CSI and helps more in improving positioning accuracy; and that a larger LTF quantity means a larger quantity of special flows included in correspondingly obtained CSI, indicating a higher space resolution and higher positioning accuracy.

To enable real-time positioning when the STA device is moving, the STA device needs to be capable of continuously obtaining CSI from an AP device in vicinity of the STA device, that is, be capable of periodically receiving PPDUs sent by an AP device in vicinity of the STA device. In 802.11, there are at least the following two types of periodically-transmitted management frames that can be used to obtain CSI: beacon frame and measurement pilot frame. For the beacon frame, an AP device in an 802.11 BSS (Basic Service Set) network has to periodically broadcast the beacon frame. In a default case, a broadcast interval of the frame is 100 ms. For the measurement pilot frame, the frame is a radio frequency measurement frame defined in 802.11 and is used to help an STA device that needs to access a Wi-Fi (wireless local area network) network quickly complete network scanning. The frame is an optional frame and information included in the frame is a subset of the beacon frame. The frame is relatively short but is broadcast at a higher frequency than the beacon frame. Generally, a broadcast interval of the frame may be configured to be 3% to 50% of a beacon frame interval. It should be noted that the CSI obtaining module on the STA device can extract CSI from PPDUs that are corresponding to all 802.11 frames sent by an AP device. That is, in addition to the foregoing management frames, the PPDUs received in this embodiment of the present invention may alternatively be PPDUs corresponding to all other existing frames in 802.11 or PPDUs corresponding to frames that may appear in 802.11 in the future, and CSI can be extracted from the PPDUs.

Operation 103. When a group of CSI is collected, the CSI obtaining module sends the group of CSI to the service request program through an asynchronous notification interface.

The group of CSI is used to represent collected CSI that is carried by one PPDU.

It should be noted that a format definition of a field "CSI report" in a CSI frame (English: CSI frame) defined in the 802.11 standard may be used for information included in and a specific expressive format of the CSI.

To ensure that the CSI can be fed back from the CSI obtaining module to the service request program in time, in this embodiment of the present invention, after the process of collecting CSI carried by one PPDU is completed, the collected group of CSI may be sent to the service request program immediately to ensure that the CSI can be fed back to the service request program as soon as possible.

The service request interface and the asynchronous notification interface that are provided in embodiments of the present invention can collect CSI between the STA device and an AP device meeting a requirement in vicinity of the STA device, in response to a CSI collection request put forward by a service request program of, for example, an upper-layer application. In this way, more comprehensive CSI can be provided for the STA device in time to address a positioning requirement, improving accuracy of a terminal positioning process.

Figure 3:
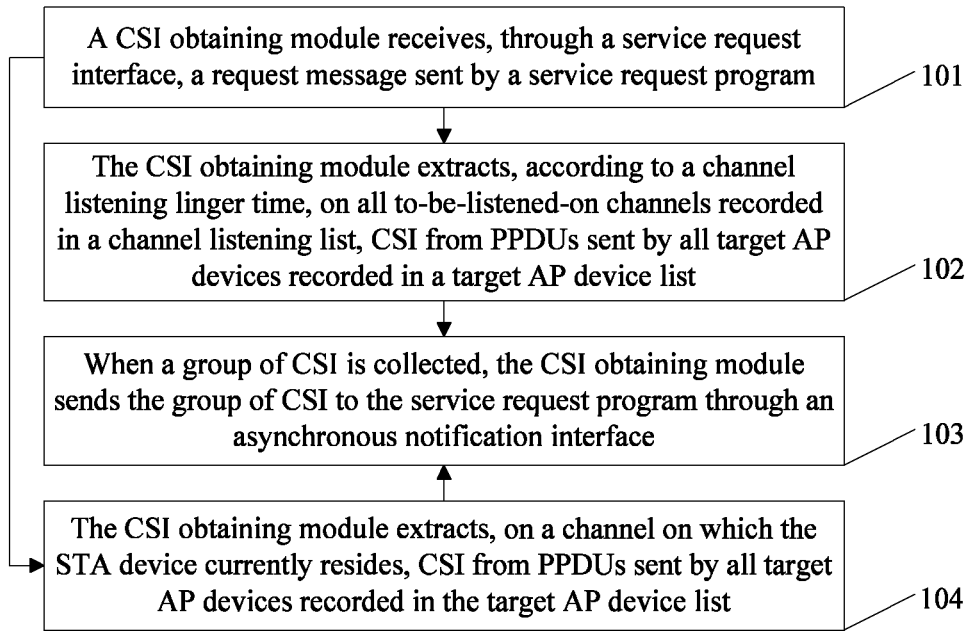
FIG. 3 to FIG. 9 are flowcharts of other 802.11 network-based CSI obtaining methods according to an embodiment of the present invention.

In view that a blank channel listening list may exist in the request message, in an implementation of this embodiment of the present invention, when the channel listening list does not record any content, the CSI obtaining module may directly listen on target AP devices recorded in the target AP device list and extract CSI from PPDUs sent by these target AP devices, on a channel on which the STA device currently resides. Therefore, based on the implementation shown in FIG. 2, this embodiment may further be implemented as an implementation shown in FIG. 3. After operation 101 that a CSI obtaining module receives, through a service request interface, a request message sent by a service request program is performed, operation 104 may be performed.

Operation 104. The CSI obtaining module extracts, on a channel on which the STA device currently resides, CSI from PPDUs sent by all target AP devices recorded in the target AP device list.

In an embodiment of the present invention, the channel listening list does not record any content; therefore, the CSI obtaining module may listen on only the channel on which the STA device currently resides, and implements listening on the target AP devices according to the target AP device list. This means that the STA device may extract CSI only from PPDUs received on the channel on which the STA device currently resides, so that efficiency and quality of CSI obtaining are improved.

In an embodiment of the present invention, a method for extracting CSI from a designated PPDU is provided. Based on the implementation shown in FIG. 2, this embodiment may further be implemented as an implementation shown in FIG. 4. Operation 102 that the CSI obtaining module extracts, according to a channel listening linger time, on all to-be-listened-on channels recorded in a channel listening list, CSI from PPDUs sent by all target AP devices recorded in a target AP device list may be specifically implemented as operation 1021 and operation 1022.

Operation 1021. The CSI obtaining module obtains, according to the channel listening linger time, on all the to-be-listened-on channels recorded in the channel listening list, from a received PPDU, a MAC (Media Access Control) address of an AP device that sends the PPDU.

Operation 1022. The CSI obtaining module extracts CSI from the PPDU when the MAC address is a MAC address of a target AP device.

When the CSI obtaining module detects a PPDU by listening, the CSI obtaining module may demodulate and decode the PPDU, to obtain a MAC address carried in the PPDU. If the MAC address is recorded in a second list, an AP device corresponding to the MAC address is considered to be a to-be-listened-on AP device, and CSI is extracted from the PPDU.

In an embodiment of the present invention, in a CSI collecting process, the STA device can determine, according to the to-be-listened-on AP devices recorded in the second list carried in the request message, PPDUs sent by which AP devices on the to-be-listened-on channels may be used to extract CSI. When a detected PPDU is a message sent by a to-be-listened-on AP device, CSI is extracted from the PPDU, thereby ensuring that the collected CSI is CSI required by the STA device and improving efficiency and quality of CSI obtaining.

Figure 4:
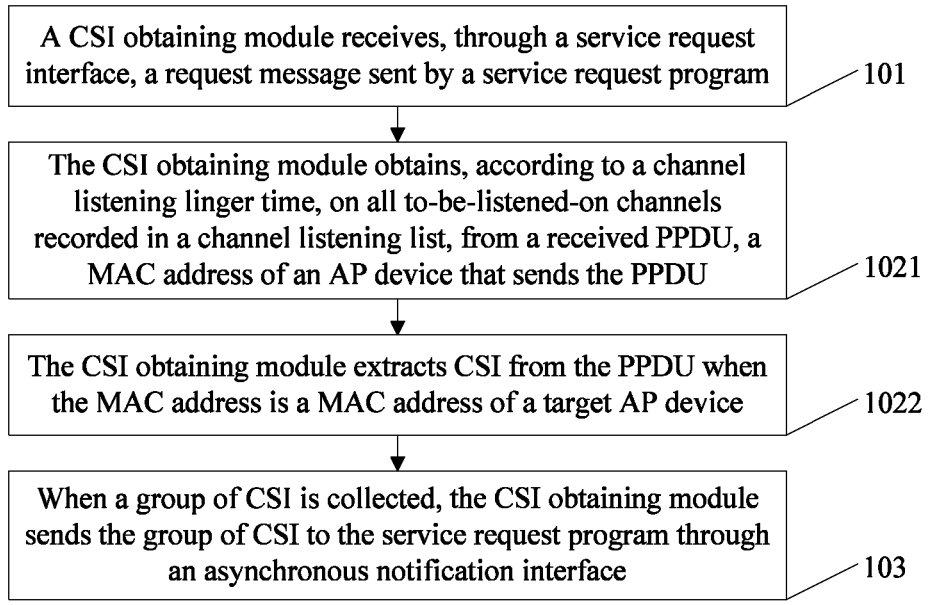
Figure 5:
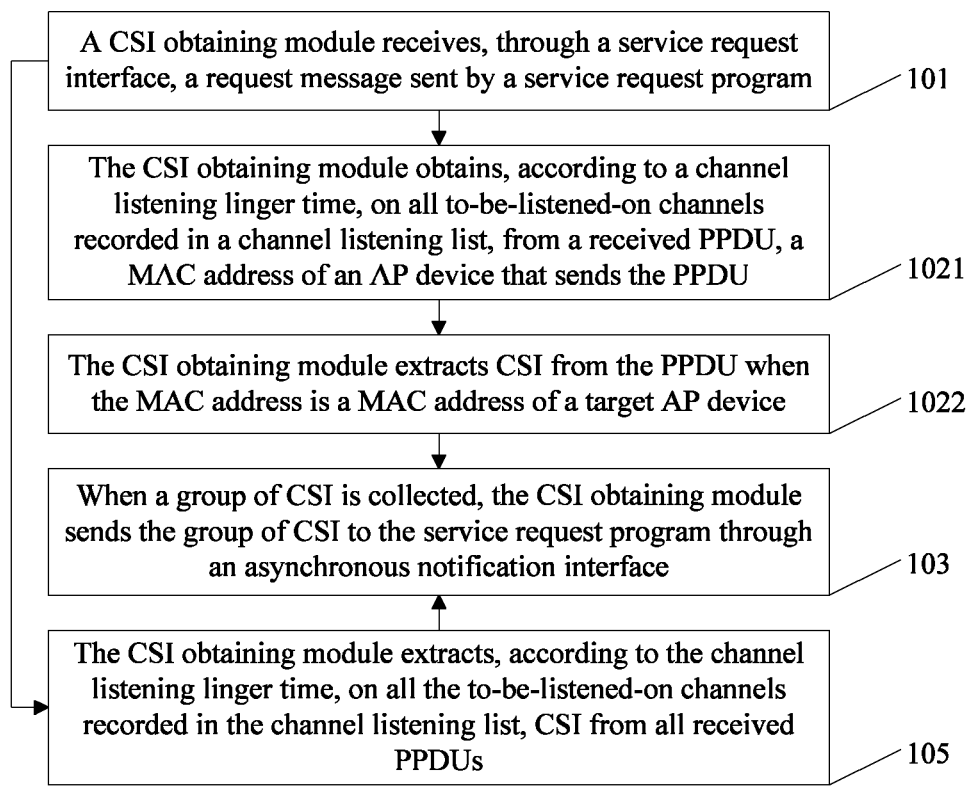

When the target AP list carried in the request message is blank, or when a special preset value is recorded in the target AP list, where the special preset value does not represent a MAC address of any target AP device, to ensure that the CSI obtaining module can still successfully implement a CSI obtaining operation, in an embodiment of the present invention, based on the implementation shown in FIG. 4, this embodiment may further be implemented as an implementation shown in FIG. 5. After operation 101 that a CSI obtaining module receives, through a service request interface, a request message sent by a service request program is performed, operation 105 may further be performed.

Operation 105. The CSI obtaining module extracts, according to the channel listening linger time, on all the to-be-listened-on channels recorded in the channel listening list, CSI from all received PPDUs.

In an embodiment of the present invention, if the target AP list carried in the request message is blank, the CSI obtaining module may directly extract, according to content recorded in the channel listening list, within a time specified by the channel listening linger time, CSI from a PPDU received on each to-be-listened-on channel.

Figure 6:
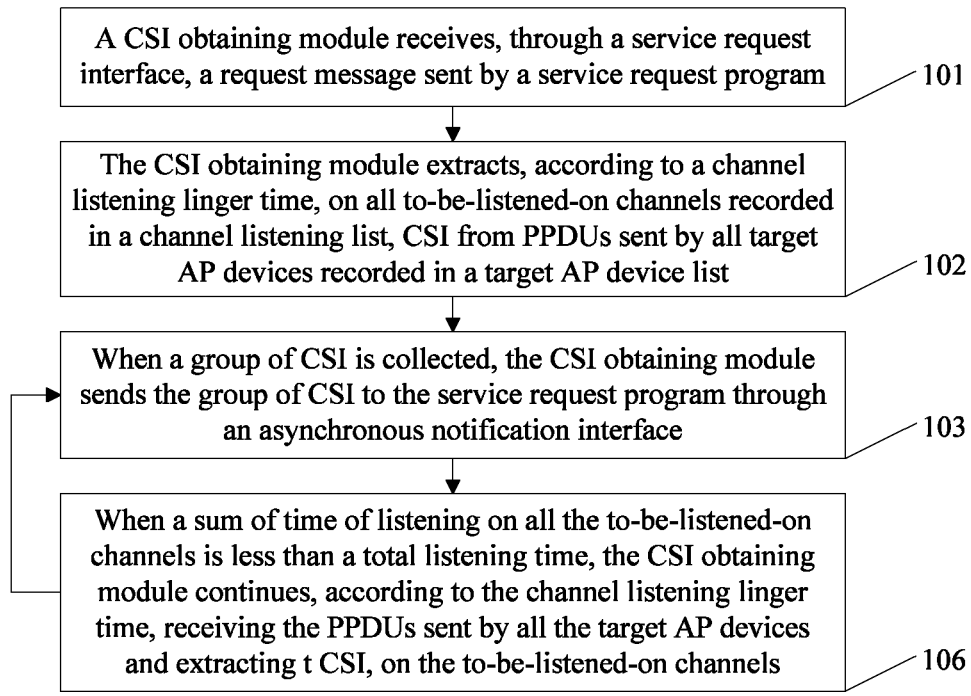

In an embodiment of the present invention, if a linger time on a current channel does not exceed the channel listening linger time, the STA device continues listening and obtaining CSI on the current channel; otherwise, the STA device changes the channel listened on by the STA device to a channel next to the current channel in the channel listening list, to perform listening and implement a CSI obtaining process on the next channel. After a CSI obtaining process on the last to-be-listened-on channel in the channel listening list is implemented, the CSI obtaining module instructs the STA device to change the operating channel to the first to-be-listened-on channel in the channel listening list, to start a next round of CSI obtaining. The foregoing CSI obtaining process is repeated until the CSI obtaining module receives a CSI collection termination message "stop obtaining CSI" that is sent by the service request program or until a total time of listening exceeds the total listening time. Then, the CSI obtaining module stops the CSI obtaining process. Therefore, for a process of repeated listening, based on the implementation shown in FIG. 2, this embodiment may further be implemented as an implementation shown in FIG. 6. After operation 103 that when a group of CSI is collected, the CSI obtaining module sends the group of CSI to the service request program through an asynchronous notification interface is performed, operation 106 may further be performed.

Operation 106. When a sum of time of listening on all the to-be-listened-on channels is less than a total listening time, the CSI obtaining module continues, according to the channel listening linger time, receiving the PPDUs sent by all the target AP devices and extracting the CSI, on the to-be-listened-on channels.

Figure 7:
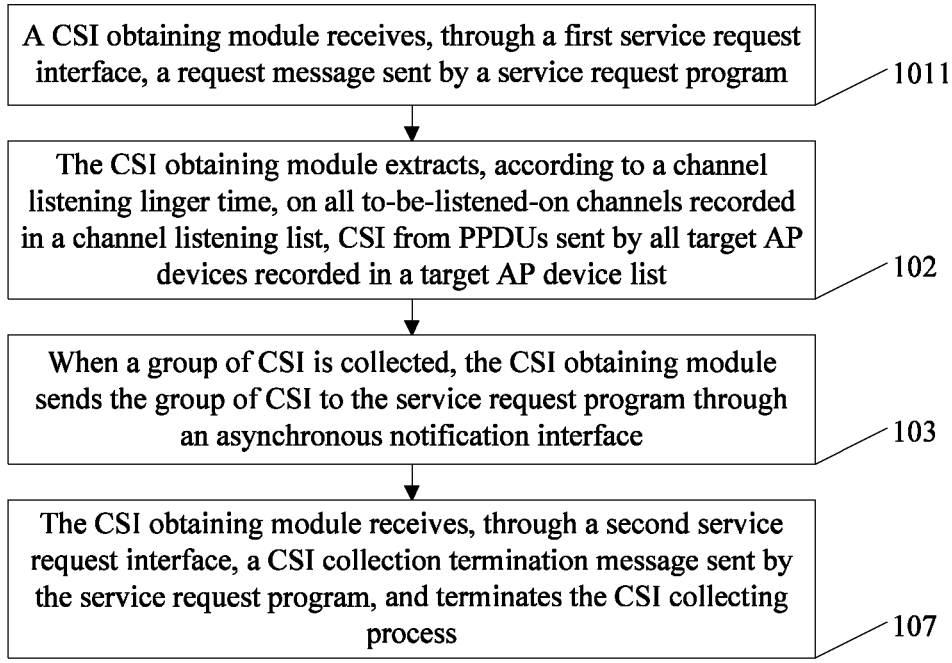

In an embodiment of the present invention, the service request interface may include a first service request interface and a second service request interface. The first service request interface is configured to receive the request message sent by the service request program, and the second service request interface is configured to receive a CSI collecting process termination message sent by the service request program. Based on the implementation shown in FIG. 2 or FIG. 6, and using FIG. 2 as an example, this embodiment may further be implemented as an implementation shown in FIG. 7. Operation 101 that a CSI obtaining module receives, through a service request interface, a request message sent by a service request program may be specifically implemented as operation 1011. After operation 103 that, when a group of CSI is collected, the CSI obtaining module sends the group of CSI to the service request program through an asynchronous notification interface is performed, operation 107 may further be performed.

Operation 1011. The CSI obtaining module receives, through a first service request interface, the request message sent by the service request program.

Operation 107. The CSI obtaining module receives, through a second service request interface, a CSI collection termination message sent by the service request program, and terminates the CSI collecting process.

Figure 8:
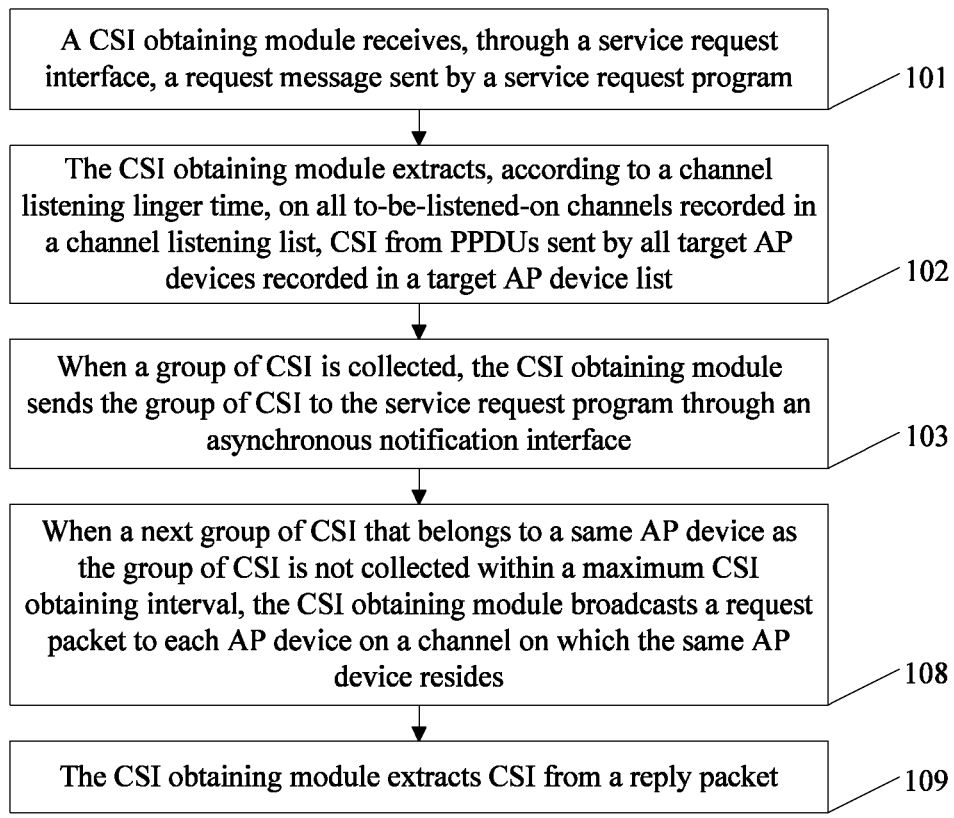

Different positioning solutions have different requirements on a time interval for obtaining CSI between a to-be-positioned STA and an AP device in vicinity of the to-be-positioned STA. To ensure that a collection interval meets a requirement of a CSI obtaining service request application in the CSI collecting process, in an embodiment of the present invention, the request message may further carry a maximum CSI obtaining interval. Based on the implementation shown in FIG. 2, this embodiment may further be implemented as an implementation shown in FIG. 8. After operation 103 that when a group of CSI is collected, the CSI obtaining module sends the group of CSI to the service request program through an asynchronous notification interface is performed, operation 108 and operation 109 may further be performed.

Operation 108. When a next group of CSI that belongs to a same AP device as the group of CSI is not collected within a maximum CSI obtaining interval, the CSI obtaining module broadcasts a request packet to each AP device on a channel on which the same AP device resides.

In this way, each AP device on the channel on which the same AP device resides sends a reply packet to the CSI obtaining module; then, the CSI obtaining module can extract CSI from the reply packet, so as to ensure that a CSI obtaining interval requirement of a current positioning solution is met.

Operation 109. The CSI obtaining module extracts CSI from a reply packet.

To ensure that the collection interval meets the requirement of the CSI obtaining service request application in the CSI collecting process, in an embodiment of the present invention, the request message may further carry an expected maximum CSI collection interval (denoted by $T_{req}$ in the following description), that is, the foregoing maximum CSI obtaining interval. When discovering that a maximum interval used by an AP device of obtained CSI to send PPDUs is greater than $T_{req}$, the CSI obtaining module may actively trigger, by using an active channel scanning mechanism, the corresponding AP device to send PPDUs, so as to obtain CSI between the CSI obtaining module and the AP device at least once in every $T_{req}$.

According to the foregoing description, in an embodiment of the present invention, the request message includes the channel listening list and the channel listening linger time (which is denoted by $T_{linger}$ in the following description), and in each round of CSI obtaining, the CSI obtaining module needs to instruct the STA device to linger, according to each to-be-listened-on channel designated in the channel listening list, on each to-be-listened-on channel for the time $T_{linger}$. For example, the channel listening list includes $N_{ch}$ channels. Then, each round of CSI obtaining needs to consume $T_{1round} = T_{linger} * N_{ch}$. The $T_{1round}$ is referred to as a basic CSI obtaining cycle in the following description, and duration indicated by the basic obtaining cycle is a minimum interval that can be achieved when the CSI obtaining module obtains CSI. It should be noted that, $T_{req}$ carried in the request message needs to be an integer multiple of $T_{1round}$.

The following describes an embodiment to ensure, by using the active channel scanning mechanism, that the CSI obtaining interval of the CSI obtaining module is less than or equal to the expected maximum CSI obtaining interval carried in the request message.

First, a statistics cycle (denoted by $T_{stat}$ in the following description) for intervals of obtaining CSI between the to-be-positioned STA device and an AP device in vicinity of the to-be-positioned STA device is defined, and a length of $T_{stat}$ may be set to be an integer multiple of $T_{req}$.

In a CSI obtaining process, when the CSI obtaining module instructs the STA device to obtain CSI by scanning channels one by one according to the channel listening list, the CSI obtaining module maintains a vicinity AP device CSI obtaining time table, and updates information in the table at intervals of $T_{stat}$. The table records channels of AP devices discovered by scanning (when the STA device receives a PPDU sent by an AP device, the AP device is considered to be discovered by scanning) in a current statistics cycle, and time points when the AP devices are discovered by scanning each time. At the end of the current statistics cycle, statistics about maximum intervals at which the AP devices are discovered by scanning (which are maximum intervals at which the STA device receives two consecutive PPDUs sent by the AP devices) are collected. Content of the vicinity AP device CSI obtaining time table may be as shown in Table 1.

TABLE 1

| AP device identifier | Operating channel | Time point of discovery by scanning | Maximum interval of discovery by scanning in the current statistics cycle |
|---|---|---|---|
| $AP_i$ | $CH_j$ | $t_1^*, t_2, t_3$ | Max $\{t_2 - t_1^*, t_3 - t_2\}$ |
| $AP_{i+1}$ | $CH_j$ | $t_4^*, t_5, t_6$ | Max $\{t_5 - t_4^*, t_6 - t_5\}$ |
| $AP_{i+2}$ | $CH_{j+1}$ | $t_7^*, t_8$ | $(t_8 - t_7^*)$ |

The column "Time point of discovery by scanning" in Table 1 records a time point when the AP device is discovered by scanning for the last time in a previous statistics cycle and a time point when the AP device is discovered by scanning in the current statistics cycle, and the time points are arranged in a time order; and the column "Maximum interval of discovery by scanning in the current statistics cycle" is obtained by calculation according to the foregoing time points. For example, in Table 1, the CSI obtaining module receives, on a channel $CH_j$, PPDUs sent by an $AP_i$ device. A time point when the CSI obtaining module receives a PPDU sent by the AP device for the last time in the previous statistics cycle is $t_1^*$. The CSI obtaining module receives two PPDUs sent by the AP device in the current statistics cycle at time points $t_2$ and $t_3$ respectively. Then, a maximum interval at which the $AP_i$ device is discovered by scanning in the current statistics cycle is a maximum value in $\{t_2-t_1^*, t_3-t_2\}$. If at the end time point of the current statistics cycle, it is found that an AP device exists in the vicinity AP device CSI obtaining time interval table, and a maximum interval at which the AP device is discovered by scanning is greater than $T_{req}$, the AP device is added to an active scanning channel list according to an operating channel of the AP device. Content of the active scanning channel list may be as shown in Table 2.

TABLE 2

| Channel | AP device identifier |
|---|---|
| $CH_j$ | $AP_i, AP_{i+1}$ |
| $CH_{j+1}$ | $AP_{i+2}$ |

The content in Table 2 indicates that, in the current statistics cycle, there are two AP devices on the channel $CH_j$, and one AP device on the channel $CH_{j+1}$ respectively, and maximum intervals in which these AP devices are discovered by scanning are greater than the expected maximum collection interval.

On each channel that appears in the active scanning channel list, the CSI obtaining module obtains CSI in an active scanning manner, that is, active scanning is performed on the channels once in every $T_{req}$. When the active scanning channel list starts to have a record, the CSI obtaining module maintains a counter, and an initial value of the counter is set to $T_{req}/T_{1round}$. Then, after each round of CSI obtaining, 1 is subtracted from a value of the counter. Each time when the value of the counter equals 1, in a current round of CSI obtaining, when channels are scanned one by one according to a first list, if a current channel appears in the active scanning channel list, the CSI obtaining module immediately instructs the STA device to actively broadcast, on the current channel, a request frame that can trigger an AP device on the channel to send a corresponding response frame (if there is only one AP device on the channel in the active scanning channel list, the request frame may alternatively be sent to the AP device through unicast), so as to extract CSI from a received PPDU that is used as the response frame, thereby increasing a frequency for obtaining CSI of the AP device on the channel. At the end of the current round of CSI obtaining, the value of the counter is reset to N. It should be noted that, performing the foregoing process repeatedly can ensure that the CSI obtaining interval for the AP in vicinity is not greater than $T_{req}$.

For example, the CSI obtaining module may instruct the STA device to broadcast an 802.11 probe request frame (English: Probe Request Frame) or unicast an 802.11 probe request frame to a specific AP device, on a channel appearing in the active scanning channel list, to trigger the AP device to send a probe response frame (English: Probe Response Frame), so as to extract CSI information from the probe response frame.

It should be noted that, when a PPDU sent by a corresponding AP device is received in the active scanning manner, a corresponding record in the foregoing vicinity AP device CSI obtaining time table is not updated. Otherwise, the corresponding AP device is to disappear from the active scanning channel list. As a result, the CSI obtaining module does not perform active scanning for the AP any more.

In addition, when a to-be-positioned terminal is moving constantly, an AP device that can be previously discovered by scanning may not continue to be discovered by scanning because of a longer distance. In the foregoing active scanning mechanism, this type of AP device enters the active scanning channel list, causing that the to-be-positioned STA device continuously sends, in a subsequent CSI obtaining process, unnecessary request frames to trigger response frames. To avoid this situation, if after the to-be-positioned STA device uses the active scanning mechanism to send a request frame successively for a plurality of times (for example, three times), the to-be-positioned STA device does not receive any response frame returned by a corresponding AP device, the corresponding AP device is removed from the active scanning channel list.

Figure 9:
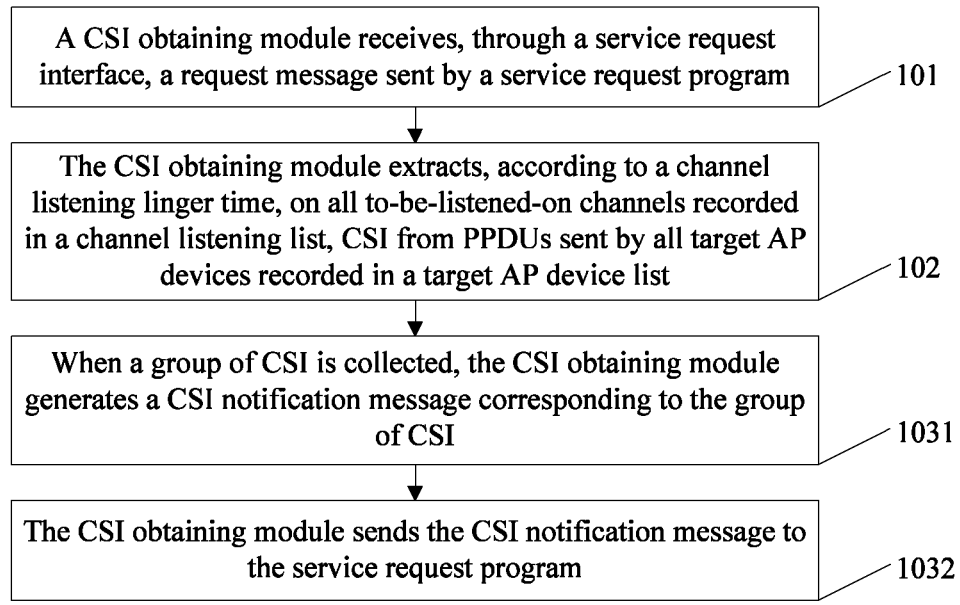

In an embodiment of the present invention, when a group of CSI is collected, the CSI obtaining module may feed back, to the service request program, a CSI notification message that carries a MAC address of an AP device and that is generated according to the group of CSI. Therefore, based on the implementation shown in FIG. 2, FIG. 5, or FIG. 8, and using FIG. 2 as an example, this embodiment may further be implemented as an implementation shown in FIG. 9. Operation 103 that, when a group of CSI is collected, the CSI obtaining module sends the group of CSI to the service request program through an asynchronous notification interface may be specifically implemented as operation 1031 and operation 1032.

Operation 1031. When the group of CSI is collected, the CSI obtaining module generates a CSI notification message corresponding to the group of CSI.

The CSI notification message includes a MAC address and content of the group of CSI. The MAC address is a MAC address of an AP device that sends the PPDU carrying the group of CSI.

Operation 1032. The CSI obtaining module sends the CSI notification message to the service request program.

In the listening process, once a group of CSI between the STA device and an AP device is obtained, the CSI obtaining module may immediately generate a CSI notification message and transfer the CSI notification message to the service caller, that is, the service request program, through the CSI asynchronous notification interface. In this embodiment of the present invention, the CSI notification message includes the following content:

<MAC Address of a Transmit End AP Device, CSI>

A format definition of a field "CSI report" in a CSI frame defined in the 802.11 standard may be used for information included in and a specific expressive format of the CSI.

In an embodiment of the present invention, the CSI obtaining module feeds back the CSI notification message to the service request program in response to the request message sent by the service request program. This means that data of the group of CSI is transmitted between the CSI obtaining module and the service request program in an asynchronous manner; later, the service request program may call the group of CSI according to the CSI notification message.

In the embodiments of the present invention, a CSI obtaining apparatus may be divided into functional modules according to the foregoing method example. For example, division of functional units may be corresponding to functions, or two or more functions may be integrated into one processing unit. The foregoing integrated unit may be implemented in a form of hardware, or may be implemented in a form of a software functional unit. It should be noted that, the unit division in the embodiments of the present invention is an example, and is merely logical function division and may be other division in actual implementation.

Figure 10:
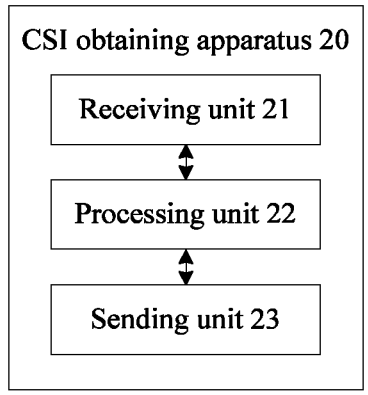
FIG. 10 is a schematic structural diagram of an 802.11 network-based CSI obtaining apparatus according to an embodiment of the present invention.

When division of functional units is corresponding to functions, FIG. 10 shows a possible schematic structural diagram of a CSI obtaining apparatus involved in the foregoing embodiments. The CSI obtaining apparatus includes: a receiving unit, a processing unit, and a sending unit. The receiving unit is configured to support the CSI obtaining apparatus in performing process 101 in FIG. 2 and process 107 in FIG. 7. The processing unit is configured to support the CSI obtaining apparatus in performing process 102 in FIG. 2, process 104 in FIG. 3, process 1021 and process 1022 in FIG. 4, process 105 in FIG. 5, and process 106 in FIG. 6. The sending unit is configured to support the CSI obtaining apparatus in performing process 103 in FIG. 2, process 108 in FIG. 8, and process 1031 and process 1032 in FIG. 9. All content of the operations in the foregoing method embodiments may be incorporated into descriptions about functions of corresponding functional units by reference. Details are not described herein.

When an integrated unit is used, FIG. 10 shows a possible schematic structural diagram of a CSI obtaining apparatus involved in the foregoing embodiments. The CSI obtaining apparatus 20 includes: a receiving unit 21, a processing unit 22, and a sending unit 23. The receiving unit 21 and the sending unit 23 are configured to support communication between the CSI obtaining apparatus and the service request program. The processing unit 22 is configured to control and manage actions of the CSI obtaining apparatus, for example, the processing unit 22 is configured to support the CSI obtaining apparatus in performing process 102 in FIG. 2, process 104 in FIG. 3, process 1021 and process 1022 in FIG. 4, process 105 in FIG. 5, process 106 in FIG. 6, and/or another process in the technology described in embodiments of the present invention. The terminal may further include a storage unit 23, configured to store program code and data of a base station.

The processing unit 22 may be a processor or a controller, for example, may be a central processing unit (English: Central Processing Unit, CPU for short), a general process unit, a digital signal processor (English: Digital Signal Processor, DSP for short), an application-specific integrated circuit (English: Application-Specific Integrated Circuit, ASIC for short), a field-programmable gate array (English: Field Programmable Gate Array, FPGA for short) or other programmable logic device, a transistor logic device, a hardware component, or any combination thereof. The processing unit 22 may implement or execute various example logical blocks, modules, and circuits described with reference to content disclosed in embodiments of the present invention. Alternatively, the processor may be a combination implementing a computing function, for example, a combination of one or more microprocessors, or a combination of a DSP and a microprocessor. Functions of the receiving unit 21 and the sending unit 23 may be implemented by using a communications module, and the communications module may be specifically a transceiver, a transceiver circuit, a communications interface, or the like. The storage unit 23 may be a memory.

Figure 11:
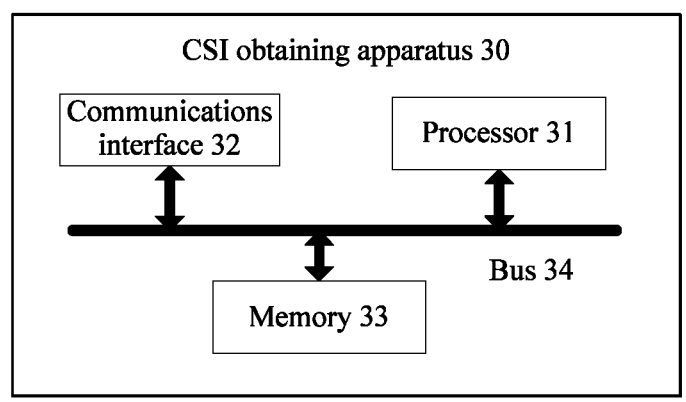
FIG. 11 is a schematic structural diagram of another 802.11 network-based CSI obtaining apparatus according to an embodiment of the present invention.

When the receiving unit 21 and the sending unit 23 are communications interfaces, the processing unit 22 is a processor, and the storage unit 23 is a memory, the CSI obtaining apparatus involved in the embodiments of the present invention may be a CSI obtaining apparatus shown in FIG. 11.

Referring to FIG. 11, the CSI obtaining apparatus 30 includes: a processor 31, a communications interface 32, a memory 33, and a bus 34. The processor 31, the communications interface 32, and the memory 33 are connected by using the bus 34. The bus 34 may be a peripheral component interconnect standard (English: Peripheral Component Interconnect, PCI for short) bus, an extended industry standard architecture (English: Extended Industry Standard Architecture, EISA for short) bus, or the like. The bus may be classified into an address bus, a data bus, a control bus, and the like. For ease of representation, only one thick line is used to represent the bus in FIG. 11, but this does not mean that there is only one bus or only one type of bus.

Method or algorithm operations described in combination with the content disclosed in embodiments of the present invention may be implemented by using hardware, or may be implemented by a processor by executing a software instruction. The software instruction may include a corresponding software module. The software module may be stored in a random access memory (English: Random Access Memory, RAM for short), a flash memory, a read-only memory (English: Read Only Memory, ROM for short), an erasable programmable read only memory (English: Erasable Programmable ROM, EPROM for short), an electrically erasable programmable read only memory (English: Electrically EPROM, EEPROM for short), a register, a hard disk, a mobile hard disk, a compact disc read-only memory (CD-ROM for short), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by using hardware, software, firmware, or any combination thereof. When the present invention is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. An 802.11 network-based CSI obtaining method, the method comprises:
   receiving, by a channel state information (CSI) obtaining module through a service request interface, a request message sent by a service request program, wherein the request message comprises at least a channel listening list, a channel listening linger time, and a target access point (AP) device list, the channel listening list records a to-be-listened-on frequency band and a to-be-listened-on channel corresponding to each to-be-listened-on frequency band, and the channel listening linger time is a time for which the CSI obtaining module listens to a physical-layer protocol data unit (PPDU) sent by a target AP device and extracts CSI from the PPDU, on a single channel, wherein the method is applied to a station (STA) device on an 802.11 network, the STA device is provided with the CSI obtaining module and the service request program that runs on the STA device, the service request program and the CSI obtaining module are capable of transmitting data to each other through the service request interface and an asynchronous notification interface;
   extracting, by the CSI obtaining module according to the channel listening linger time, on all to-be-listened-on channels recorded in the channel listening list, CSI from PPDUs sent by all target AP devices recorded in the target AP device list;
   when a group of CSI is collected, sending, by the CSI obtaining module, the group of CSI to the service request program through the asynchronous notification interface, wherein the group of CSI is used to represent collected CSI that is carried by one PPDU; and
   when the channel listening list does not record any content, after receiving, by the CSI obtaining module through the service request interface, the request message sent by the service request program, extracting, by the CSI obtaining module, on a channel on which the STA device currently resides, CSI from PPDUs sent by all target AP devices recorded in the target AP device list.

2. The method according to claim 1, wherein the extracting, by the CSI obtaining module, CSI from PPDUs sent by all target AP devices recorded in the target AP device list comprises:
   obtaining, by the CSI obtaining module, from a received PPDU, a media access control (MAC) address of an AP device that sends the PPDU; and
   extracting, by the CSI obtaining module, CSI from the PPDU when the MAC address is a MAC address of a target AP device.

3. The method according to claim 2, further comprising:
   when the target AP device list does not record any content, or when there is at least one target AP device whose MAC address is a special preset value in the target AP device list, and the special preset value does not represent a MAC address of any target AP device, after the receiving, by the CSI obtaining module through the service request interface, a request message sent by the service request program, extracting, by the CSI obtaining module according to the channel listening linger time, on all to-be-listened-on channels recorded in the channel listening list, CSI from all received PPDUs.

4. The method according to claim 1, further comprising:
   after the sending, by the CSI obtaining module, the group of CSI to the service request program through the asynchronous notification interface and when a sum of time of listening on all the to-be-listened-on channels is less than a total listening time, continuing, by the CSI obtaining module according to the channel listening linger time, receiving the PPDUs sent by all the target AP devices and extracting the CSI, on the to-be-listened-on channels, wherein the request message further comprises the total listening time.

5. The method according to claim 1, wherein the service request interface comprises a first service request interface and a second service request interface; wherein the receiving, by the CSI obtaining module through the service request interface, a request message sent by the service request program comprises:
   receiving, by the CSI obtaining module through the first service request interface, the request message sent by the service request program; and after the sending, by the CSI obtaining module, the group of CSI to the service request program through the asynchronous notification interface, the method comprises:
receiving, by the CSI obtaining module through the second service request interface, a CSI collection termination message sent by the service request program, and terminating a CSI collecting process.

6. The method according to claim 1, further comprising:
when a next group of CSI that belongs to a same AP device as the group of CSI is not collected within a maximum CSI obtaining interval, broadcasting, by the CSI obtaining module, a request packet to each AP device on a channel on which the same AP device resides, so that each AP device on the channel on which the same AP device resides sends a reply packet to the CSI obtaining module; and
extracting, by the CSI obtaining module, CSI from the reply packet, wherein the request message further comprises the maximum CSI obtaining interval, and after the group of CSI is collected.

7. The method according to claim 1, wherein the sending, by the CSI obtaining module, the group of CSI to the service request program through the asynchronous notification interface comprises:
generating, by the CSI obtaining module, a CSI notification message corresponding to the group of CSI, wherein the CSI notification message comprises a MAC address and content of the group of CSI, and the MAC address is a MAC address of an AP device that sends the PPDU carrying the group of CSI; and
sending, by the CSI obtaining module, the CSI notification message to the service request program.

8. An 802.11 network-based channel state information (CSI) obtaining apparatus, the CSI obtaining apparatus comprises:
a receiving unit, configured to receive, through a service request interface, a request message sent by a service request program, wherein the request message comprises at least a channel listening list, a channel listening linger time, and a target access point (AP) device list, the channel listening list records a to-be-listened-on frequency band and a to-be-listened-on channel corresponding to each to-be-listened-on frequency band, and the channel listening linger time is a time for which the CSI obtaining apparatus listens to a physical-layer protocol data unit (PPDU) sent by a target AP device and extracts CSI from the PPDU, on a single channel, wherein the apparatus is applied to a station (S)TA device on an 802.11 network, the STA device is further provided with the service request program that runs on the STA device, the service request program and the CSI obtaining apparatus are capable of transmitting data to each other through the service request interface and an asynchronous notification interface;
a processing unit, configured to:
extract, according to the channel listening linger time, on all to-be-listened-on channels recorded in the channel listening list, CSI from physical-layer protocol data units PPDUs sent by all target AP devices recorded in the target AP device list; and
when the channel listening list does not record any content, extract, on a channel on which the STA device currently resides, CSI from PPDUs sent by all target AP devices recorded in the target AP device list; and a sending unit, configured to: when a group of CSI is collected, send the group of CSI to the service request program through the asynchronous notification interface, wherein the group of CSI is used to represent collected CSI that is carried by one PPDU.

9. The CSI obtaining apparatus according to claim 8, wherein the processing unit is further configured to:
obtain, from a received PPDU, a media access control MAC address of an AP device that sends the PPDU; and
extract CSI from the PPDU when the MAC address is a MAC address of a target AP device.

10. The CSI obtaining apparatus according to claim 9, wherein, the processing unit is further configured to extract, according to the channel listening linger time, on all to-be-listened-on channels recorded in the channel listening list, CSI from all received PPDUs when the target AP device list does not record any content, or when there is at least one target AP device whose MAC address is a special preset value in the target AP device list, and the special preset value does not represent a MAC address of any target AP device.

11. The CSI obtaining apparatus according to claim 8, wherein the processing unit is further configured to: when a sum of time of listening on all the to-be-listened-on channels is less than a total listening time, continue, according to the channel listening linger time, receiving the PPDUs sent by all the target AP devices and extracting the CSI, on the to-be-listened-on channels, wherein the request message further comprises the total listening time.

12. The CSI obtaining apparatus according to claim 8, the receiving unit is further configured to:
receive, through a first service request interface, the request message sent by the service request program; and
the receiving unit is further configured to: receive, through a second service request interface, a CSI collection termination message sent by the service request program, and terminate a CSI collecting process, wherein the service request interface comprises the first service request interface and the second service request interface.

13. The CSI obtaining apparatus according to claim 8, wherein the sending unit is further configured to: when a next group of CSI that belongs to a same AP device as the group of CSI is not collected within a maximum CSI obtaining interval, broadcast a request packet to each AP device on a channel on which the same AP device resides, so that each AP device on the channel on which the same AP device resides sends a reply packet to the CSI obtaining apparatus; and
the processing unit is further configured to extract CSI from the reply packet.

14. The CSI obtaining apparatus according to claim 8, wherein the sending unit is further configured to:
generate a CSI notification message corresponding to the group of CSI, wherein the CSI notification message comprises a MAC address and content of the group of CSI, and the MAC address is a MAC address of an AP device that sends the PPDU carrying the group of CSI; and send the CSI notification message to the service request program.

15. A non-transitory machine-readable medium having instructions stored therein, which when executed by a processor, cause the processor to perform operations, the operations comprising:
receiving, by a channel state information (CSI) obtaining module through a service request interface, a request message sent by a service request program, wherein the request message comprises at least a channel listening list, a channel listening linger time, and a target access point (AP) device list, the channel listening list records a to-be-listened-on frequency band and a to-be-listened-on channel corresponding to each to-be-listened-on frequency band, and the channel listening linger time is a time for which the CSI obtaining module listens to a physical-layer protocol data unit (PPDU) sent by a target AP device and extracts CSI from the PPDU, on a single channel, wherein the method is applied to a station (STA) device on an 802.11 network, the STA device is provided with the CSI obtaining module and the service request program that runs on the STA device, the service request program and the CSI obtaining module are capable of transmitting data to each other through the service request interface and an asynchronous notification interface;

extracting, by the CSI obtaining module according to the channel listening linger time, on all to-be-listened-on channels recorded in the channel listening list, CSI from PPDUs sent by all target AP devices recorded in the target AP device list;

when a group of CSI is collected, sending, by the CSI obtaining module, the group of CSI to the service request program through the asynchronous notification interface, wherein the group of CSI is used to represent collected CSI that is carried by one PPDU; and when the channel listening list does not record any content, after receiving, by the CSI obtaining module through the service request interface, the request message sent by the service request program, extracting, by the CSI obtaining module, on a channel on which the STA device currently resides, CSI from PPDUs sent by all target AP devices recorded in the target AP device list.

16. The non-transitory machine-readable medium according to claim 15, wherein the extracting, by the CSI obtaining module, CSI from PPDUs sent by all target AP devices recorded in the target AP device list comprises:

obtaining, by the CSI obtaining module, from a received PPDU, a media access control (MAC) address of an AP device that sends the PPDU; and extracting, by the CSI obtaining module, CSI from the PPDU when the MAC address is a MAC address of a target AP device.

17. The non-transitory machine-readable medium according to claim 16, wherein the operations further comprising:

when the target AP device list does not record any content, or when there is at least one target AP device whose MAC address is a special preset value in the target AP device list, and the special preset value does not represent a MAC address of any target AP device, after the receiving, by the CSI obtaining module through the service request interface, a request message sent by the service request program, extracting, by the CSI obtaining module according to the channel listening linger time, on all to-be-listened-on channels recorded in the channel listening list, CSI from all received PPDUs.

* * * * *